(12) United States Patent
Nakao (10) Patent No.: US 7,623,310 B2
(45) Date of Patent: Nov. 24, 2009

(54) MAGNETIC RECORDING MEDIUM, SERVO SIGNAL WRITE HEAD UNIT, AND SERVO WRITER

(75) Inventor: Toru Nakao, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/129,426

(22) Filed: May 16, 2005

(65) Prior Publication Data

US 2005/0254163 A1   Nov. 17, 2005

(30) Foreign Application Priority Data

May 14, 2004   (JP)   ............... 2004-145136

(51) Int. Cl.
  *G11B 5/09*    (2006.01)
  *G11B 5/584*   (2006.01)
  *G11B 5/127*   (2006.01)
  *G11B 5/265*   (2006.01)

(52) U.S. Cl. ............ 360/48; 360/77.12; 360/118; 360/121

(58) Field of Classification Search ............ None
See application file for complete search history.

(56) References Cited

U.S. PATENT DOCUMENTS

| | | | |
|---|---|---|---|
| 4,996,609 A | 2/1991 | Joannou | |
| 5,689,384 A | 11/1997 | Albrecht et al. | |
| 5,982,711 A | 11/1999 | Knowles et al. | |
| 6,021,013 A | 2/2000 | Albrecht et al. | |
| 6,172,833 B1 | 1/2001 | Fry et al. | |
| 6,282,051 B1 | 8/2001 | Albrecht et al. | |
| 6,320,719 B1 | 11/2001 | Albrecht et al. | |
| 6,347,016 B1 | 2/2002 | Ishida et al. | |
| 6,411,460 B1* | 6/2002 | Fasen | 360/75 |
| 6,744,594 B2* | 6/2004 | Denison et al. | 360/121 |
| 6,943,979 B2* | 9/2005 | Goker et al. | 360/77.12 |
| 6,947,247 B2* | 9/2005 | Schwarz et al. | 360/76 |
| 6,970,312 B2 | 11/2005 | Yip et al. | |
| 6,999,258 B2 | 2/2006 | Molstad et al. | |

(Continued)

FOREIGN PATENT DOCUMENTS

EP   0 690 442 A2   1/1996

(Continued)

OTHER PUBLICATIONS

European Office Action dated Sep. 10, 2007 issued in European Patent Application No. 05010478.5.

*Primary Examiner*—Andrew L Sniezek
(74) *Attorney, Agent, or Firm*—Sughrue Mion, PLLC (57) ABSTRACT

Disclosed is a magnetic recording medium which enables a magnetic head to be accurately positioned even if higher-density recording of magnetic recording media is reinforced. The magnetic recording medium includes at least one servo band being magnetized in one direction and including a plurality of servo patterns being formed repeatedly along a long side of the servo band. Furthermore, each of the servo patterns includes a first magnetizing area being formed across a width of the servo band at an angle from 8 to 20 degrees with respect to the width, and a second magnetizing area being formed across the width of the servo band in non-parallel with the first magnetizing area. In addition, the first and second magnetizing areas are magnetized in a direction opposite to that of the servo band.

22 Claims, 9 Drawing Sheets

U.S. PATENT DOCUMENTS

| | | |
|---|---|---|
| 2003/0099057 A1 | 5/2003 | Molstad |
| 2003/0123179 A1* | 7/2003 | Molstad et al. ............... 360/75 |
| 2004/0032685 A1* | 2/2004 | Trabert et al. ................ 360/75 |
| 2004/0208694 A1 | 10/2004 | Nakao |
| 2004/0223248 A1* | 11/2004 | Dugas et al. .................. 360/48 |
| 2005/0099718 A1* | 5/2005 | Takano et al. ................ 360/66 |
| 2005/0168869 A1* | 8/2005 | Dugas et al. ............... 360/118 |
| 2005/0219734 A1 | 10/2005 | Rothermel et al. |

FOREIGN PATENT DOCUMENTS

| | | |
|---|---|---|
| GB | 2 099 204 A | 12/1982 |
| JP | 10-040522 A | 2/1998 |
| JP | 11-007620 A | 1/1999 |
| JP | 2000-293827 A | 10/2000 |
| JP | 2003-168203 A | 6/2003 |
| JP | 2003-257009 A | 9/2003 |

* cited by examiner

MAGNETIC RECORDING MEDIUM, SERVO SIGNAL WRITE HEAD UNIT, AND SERVO WRITER

BACKGROUND OF THE PRESENT INVENTION

1. Field of the Invention

The present invention relates to a magnetic recording medium, such as a magnetic tape, in which servo signals are written, a servo signal write head unit for writing servo signals in the magnetic recording medium, and a servo writer including the servo signal write head unit.

2. Description of the Related Art

Conventionally, in order to allow a read/write element of a magnetic head to track data tracks of a magnetic tape in which magnetic information is to be recorded, servo signals are written in the magnetic tape. A timing base technique has been known as a technique for writing servo signals in a magnetic tape (For example, refer to U.S. Patent Application Publication No. 5,689,384). As shown in, for example, FIG. 9A, writing of servo signals in this technique is achieved by forming a first magnetizing area SP1 and a second magnetizing area SP2 in a servo band SB extending along the running direction of a magnetic tape MT so as to cross the servo band SB.

Figure 9A:
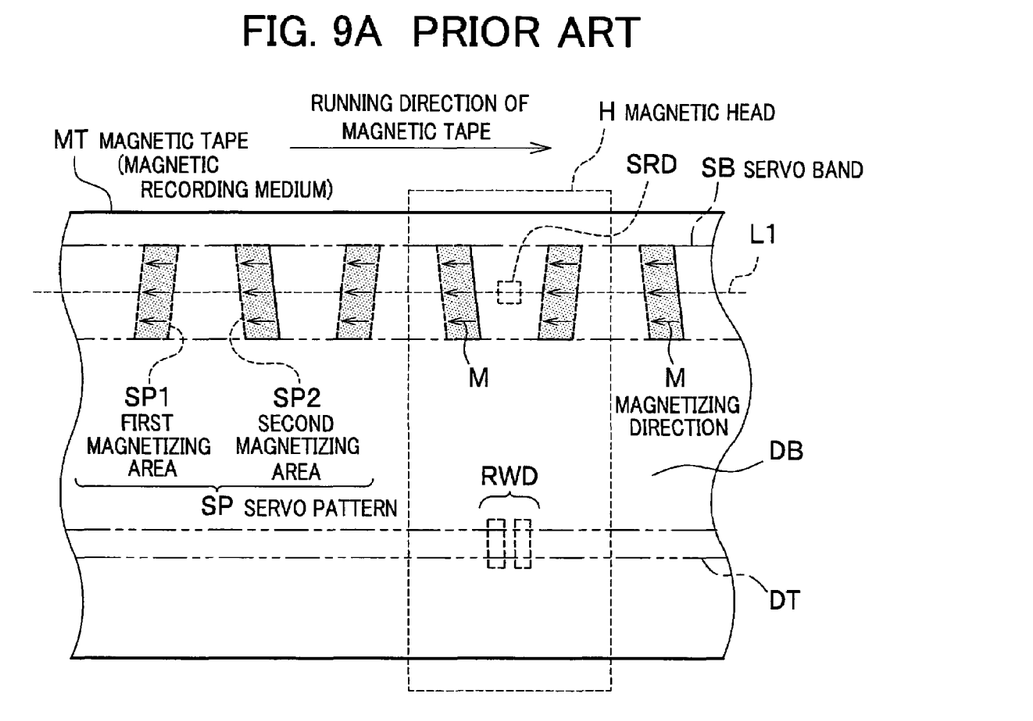
FIG. 9A is an exemplary view of a conventional magnetic tape.
Figure 9B:
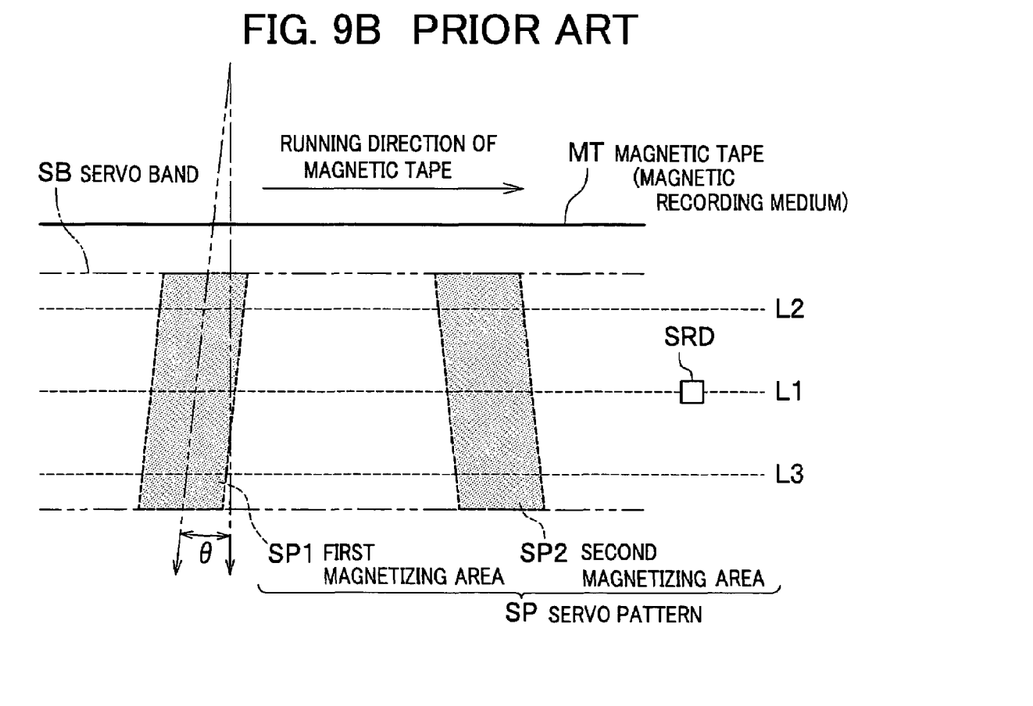
FIG. 9B is an enlarged view of servo patterns according to a conventional magnetic tape.

In this example, as shown in FIG. 9B, a servo pattern SP is composed of a combination of the first magnetizing area SP1 and the second magnetizing area SP2. Specifically, the first magnetizing area SP1 is inclined at a predetermined angle θ with respect to the width direction of the servo band SB, and the second magnetizing area SP2 is inclined at an angle differing from the angle of the first magnetizing area SP1. The first magnetizing area SP1 and the second magnetizing area SP2 are formed and magnetized so that, as shown in FIG. 9A, the magnetizing direction of the servo band SB is oriented in one direction by a servo write head (not illustrated), that is, in the example shown in FIG. 9A, oriented in the direction shown by the magnetizing direction M. In addition, servo patterns SP each composed of the first magnetizing area SP1 and the second magnetizing area SP2 are repeatedly formed in the direction along which the servo band SB extends.

On the other hand, as shown in FIG. 9A, a read/write element RWD of the magnetic head H is constructed to trace a predetermined data track DT formed in the data band of the running magnetic tape MT, when the servo signal read element SRD of the magnetic head H traces, for example, the centerline L1 of the servo band SB. Furthermore, the servo signal read element SRD senses magnetic fluxes from the first magnetizing area SP1 and the second magnetizing area SP2 whenever the servo signal read element SRD crosses the two areas. At this time, the servo signal read element SRD senses the fluxes at constant timing as long as the servo signal read element SRD traces the centerline L1 of the servo band SB as shown in FIG. 9B. On the other hand, when the servo signal read element SRD traces the line L2, that is, a line at the side where the interval between the first magnetizing area SP1 and the second magnetizing area SP2 is shortened due to the displacement of the servo signal read element SRD in the width direction of the servo band SB, the time period when the servo signal read element SRD senses the fluxes is decreased. On the other hand, when the servo signal read element SRD traces the line L3, that is, a line at the side where the interval between the areas is widened, the time period is increased. In other words, the magnetic head H is positioned such that the sensing timing becomes a predetermined value, whereby the read/write element RWD of the magnetic head H can trace a predetermined data track DT.

However, it has been known that, in such a magnetic tape MT, the angle θ of the first magnetizing area SP1 (refer to FIG. 9B) is typically set to 6 degrees or less due to the azimuth loss, and if the angle θ exceeds 6 degrees, the output and SN ratio of servo signals deteriorate.

On the other hand, in recent years, high-density recording of magnetic tapes has advanced, and in the data bands DB (refer to FIG. 9A) of a magnetic tape MT, several hundreds of data tracks DT have been formed in the width direction of the magnetic tape MT. As a result, the widths and intervals of the data tracks DT are remarkably narrowed, and simultaneously, the widths of the data bands DB are also narrowed. In the future, it is considered that a further high-density recording of magnetic tapes MT will advance, wherein higher accuracy is required for positioning of the magnetic head H (refer to FIG. 9A) in the width direction of magnetic tapes MT.

As the widths of the servo bands SB are narrowed, it is more necessary to heighten resolution of servo signals in the width direction of the servo bands SB. Therefore, in order to enhance the resolution of servo signals in the width direction of the servo bands SB, it is considered that the angle θ of the first magnetizing area SP1 is defined to be a larger value. However, it is impossible to accurately position the magnetic head H with respect to the magnetic tape MT due to the azimuth loss described above if the angle θ of the first magnetizing area SP1 is set to exceed 6 degrees.

It is therefore an object of the present invention to provide a magnetic recording medium which enables a magnetic head to be accurately positioned even if higher-density recording of magnetic recording media is reinforced, a servo signal write head unit for writing servo signals in the magnetic recording medium for the purpose of obtaining such a magnetic recording medium, and a servo writer provided with the servo signal write head unit.

SUMMARY OF THE INVENTION

According to an aspect of the present invention, there is provided, a magnetic recording medium including:

(a1) at least one servo band being magnetized in one direction and including a plurality of servo patterns being formed repeatedly along a long side of the servo band, and (b2) each of the servo patterns including:

a first magnetizing area being formed across a width of the servo band at an angle from 8 to 20 degrees with respect to the width; and a second magnetizing area being formed across the width of the servo band in non-parallel with the first magnetizing area. In addition, the first and second magnetizing areas are magnetized in a direction opposite to that of the servo band.

According to another aspect of the present invention, there is provided, a servo signal write head unit including:

(a2) a DC erase head having DC erase gaps for magnetizing servo bands on a magnetic recording medium, so that a magnetizing direction of the servo bands is oriented in one direction, the DC erase head facing a surface of the magnetic recording medium; and (b2) a servo write head having servo write gaps for forming servo patterns on the servo band by magnetizing the servo band in a direction opposite to that of the servo bands, the servo write head facing the magnetic recording medium. In addition, each of the servo write gaps comprises a first servo write gap inclined at an angle from 8 to 20 degrees with respect to a width of the servo band, and a second servo write gap non-parallel to the first servo write gap.

According to further another aspect of the present invention, there is provided, a servo writer comprising a servo signal write head unit.

Other features, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE PRESENT INVENTION

Next, a detailed description is given of an embodiment of the present invention with reference to accompanying drawings. A magnetic tape, a servo writer and a servo signal write head unit according to the embodiment will be described in this order. Note that the magnetic tape corresponds to a "magnetic recording medium" herein.

(Magnetic Tape)

Figure 1A:
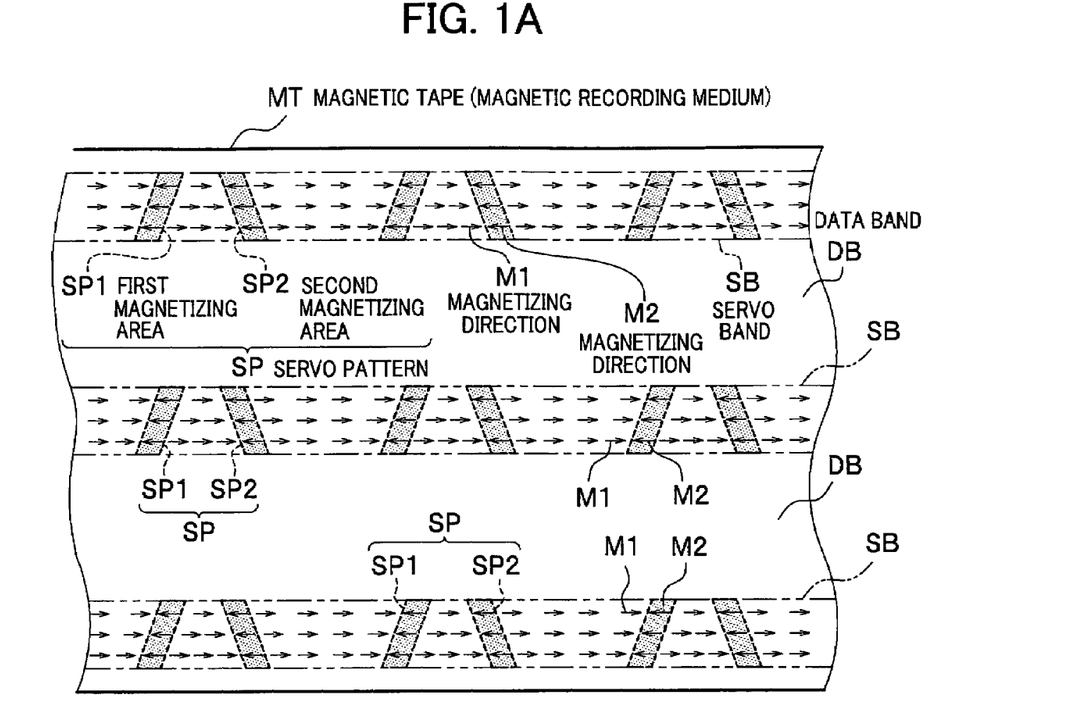
FIG. 1A is an exemplary view of a magnetic tape according to an embodiment.

As shown in FIG. 1A, three servo bands SB are arranged in parallel at equal intervals along the lengthwise direction in the magnetic tape MT. A data band DB is formed between the servo bands SB, respectively. A plurality of data tracks (not illustrated) in which magnetic information is to be recorded are formed along the lengthwise direction of the data band DB.

In base portions in which servo patterns SP are formed, the servo bands SB are magnetized by means of a DC current, and the magnetizing direction M1 is oriented in one direction of the magnetic tape MT. In this embodiment, the magnetizing direction M1 of the servo band SB is denoted by a forward direction.

In such servo bands SB, servo patterns SP for controlling the tracking of the magnetic head (not illustrated) are repeatedly formed in the direction along which the servo bands SB extend. The servo patterns SP are such that the servo bands SB are magnetized so that the magnetizing direction M2 of the servo patterns SP is made reverse of the magnetizing direction M1 of the servo bands SB. The servo pattern SP is composed of a first magnetizing area SP1 and a second magnetizing area SP2.

Figure 1B:
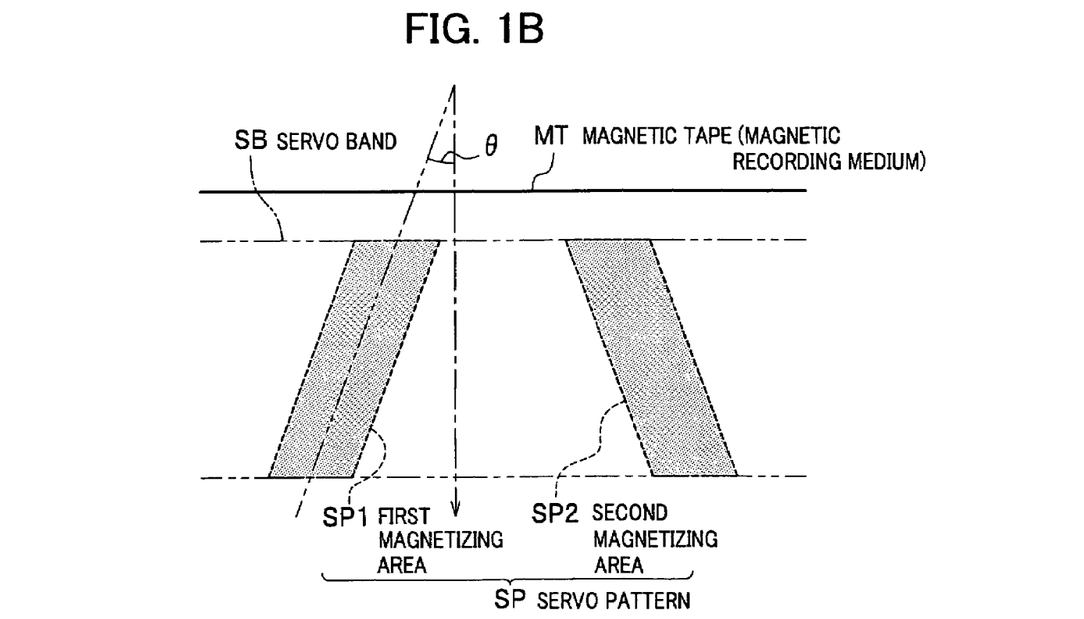
FIG. 1B is an enlarged view of a servo pattern of the magnetic tape according to the embodiment.

The first magnetizing area SP1 is formed so as to cross the servo bands SB. As shown in FIG. 1B, the first magnetizing area SP1 is inclined at an angle θ with respect to the width direction of the servo band SB. The angle θ is set to from 8 to 20 degrees, preferably, from 8 to 12 degrees.

As shown in FIGS. 1A and 1B, the second magnetizing area SP2 is formed so as to cross the servo bands SB, and is not made parallel to the first magnetizing area SP1. As for the angle of the second magnetizing area SP2 relative to the width direction of the servo bands SB, there is no special limitation as long as the second magnetizing area SP2 is not parallel to the first magnetizing area SP1. In the embodiment, the second magnetizing area SP2 is disposed to form a trapezoid shape with the first magnetizing area SP1. Further, the angle θ of the second magnetizing area SP2 with respect to the width direction of the servo band SB is −20 to −8 degrees, preferably −12 to −8 degrees.

Figure 2:
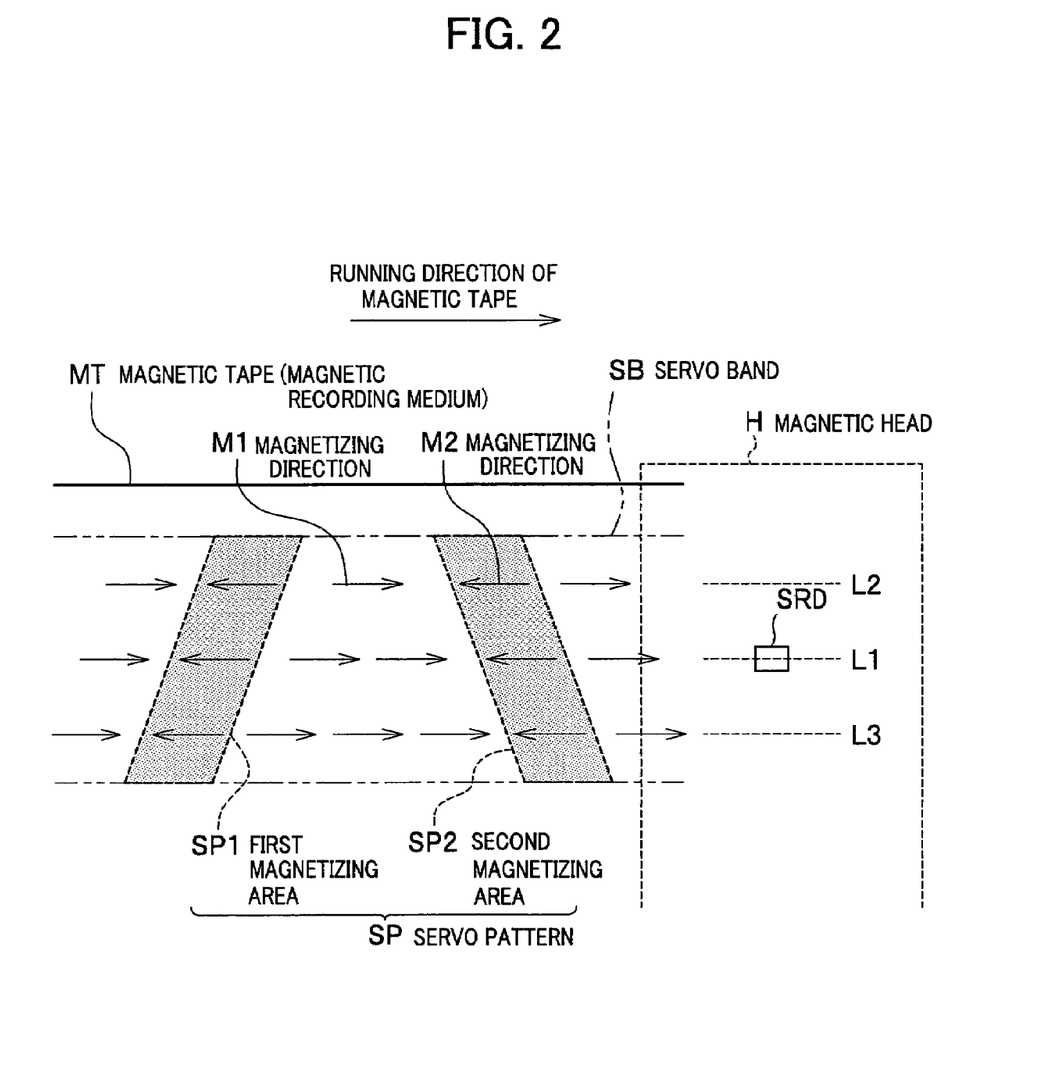
FIG. 2 is an exemplary view showing a state where, when the magnetic tape according to the embodiment runs, a servo signal read element crosses the servo pattern.

Next, a description is given, of behaviors of the magnetic tape MT, in which such servo patterns SP are formed, with reference to FIG. 2.

As shown in FIG. 2, since in the magnetic tape MT according to the embodiment, the servo signal read element SRD of the magnetic head H is positioned at a predetermined position in the width direction with respect to the servo bands SB when the magnetic tape MT runs in a predetermined running direction, the magnetic head H is positioned relative to the magnetic tape MT. In this case, a description is given, of behaviors of the magnetic tape MT, taking it as an example a case where the servo signal read element SRD is positioned so as to trace a centerline L1 of the servo bands SB.

The servo signal read element SRD of the magnetic head H senses magnetic fluxes therefrom when crossing the first magnetizing area SP1 and the second magnetizing area SP2. At this time, as shown in FIG. 2, the servo signal read element SRD senses the magnetic fluxes from the areas SP1 and SP2 at constant timing as long as tracing the centerline L1 of the servo bands SB.

However, as shown in FIG. 2, when the position of the servo signal read element SRD is displaced to thereby trace the line L2 of the servo bands SB, the time interval at which the servo signal read element SRD senses the magnetic fluxes from the areas SP1 and SP2 is shortened. This is because the first magnetizing area SP1 is inclined in a range from 8 to 20 degrees relative to the width direction of the servo bands SB as described above. In addition, when the servo signal read element SRD traces the line L3, the time interval at which the servo signal read element SRD senses them is lengthened. In addition, the variation of the above time interval is increased, as the angle θ (refer to FIG. 1B) which the first magnetizing area SP1 forms with the width direction of the servo bands SB approaches 90 degrees. In this case, the resolution of servo signals in the width direction of the servo bands SB is increased.

In contrast, the angle θ (refer to FIG. 9B) of a conventional magnetic tape MT is set to 6 degrees at most. Thus, the magnetic tape MT according to the embodiment has greater resolution of servo signals in the width direction of the servo bands SB than that of the conventional magnetic tape MT.

In addition, as shown in FIG. 2, in the magnetic tape MT according to the embodiment, the magnetizing direction M1 of the servo bands SB and the magnetizing direction M2 of the areas SP1 and SP2 are reversely oriented alternately. As a result, when the servo signal read element SRD shifts from the servo band SB to the area SP1 or SP2, the orientation of the flux from the area SP1 or SP2 is changed completely opposite from the magnetizing direction M1 to the magnetizing direction M2. Therefore, the output and SN ratio obtained from the servo signals in the magnetic tape MT are greater than those of the conventional one. Specifically, in the magnetic tape MT according to the embodiment, the angle θ (refer to FIG. 1B) of the first magnetizing area SP1 is made larger in order to increase the resolution of servo signals in the width direction of the servo bands SB. The increase in the resolution may cause the azimuth loss in the output and SN ratio of the servo signals. However, if the magnetizing direction M1 of the servo bands SB and the magnetizing direction M2 of both the areas SP1 and SP2 are reversed from each other, the output and SN ratio of the servo signals are increased, thereby compensating the azimuth loss. As a result, with the magnetic tape MT, higher-density recording can be achieved, and the magnetic head H can be accurately positioned with respect to the magnetic tape MT even if the width of the servo bands SB is narrowed.

(Servo Writer)

Figure 3:
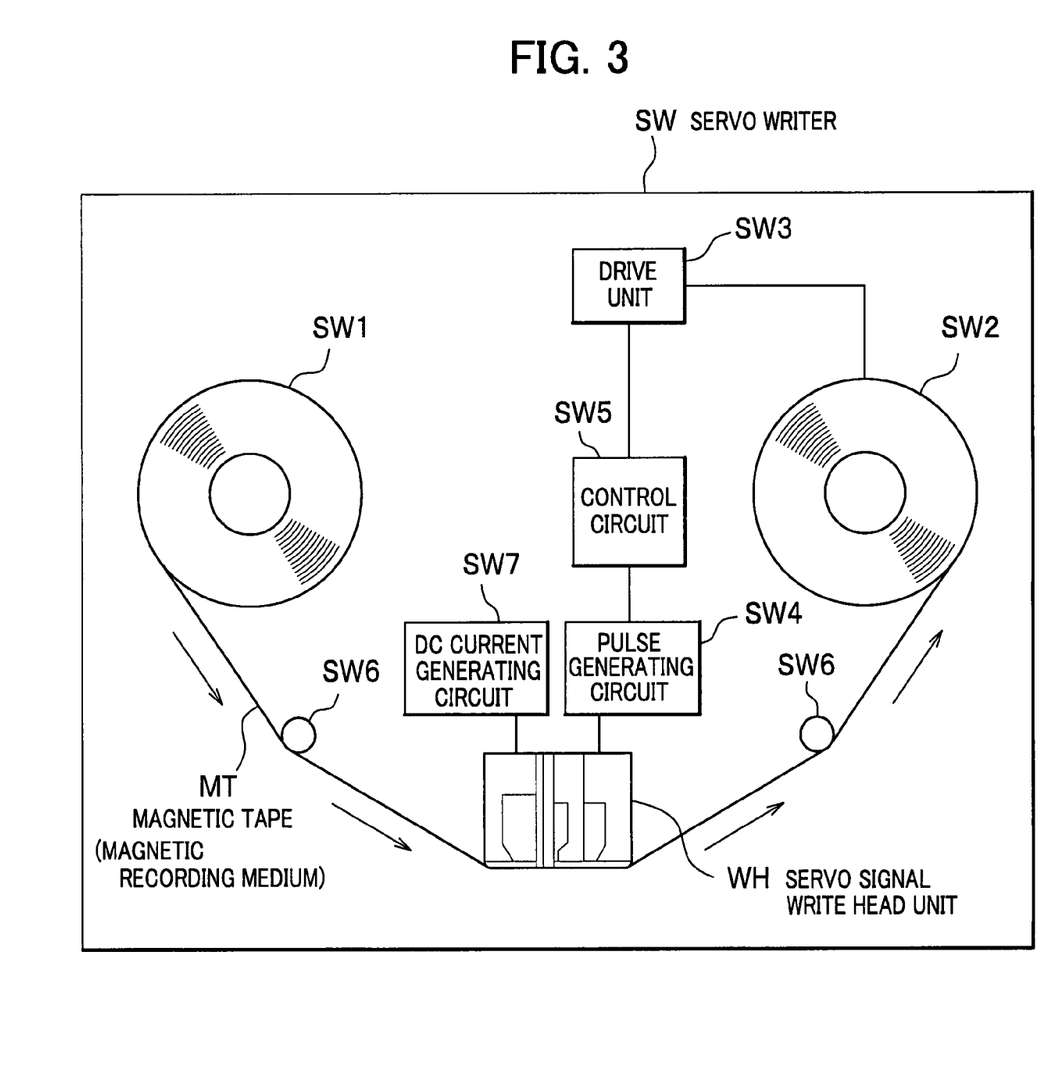
FIG. 3 is an exemplary view of a servo writer.

Next, with reference to FIG. 3, a description is given of a servo writer for writing servo signals in a magnetic tape in order to obtain a magnetic tape according to the embodiment.

As shown in FIG. 3, the servo writer SW is mainly provided with a supply reel SW1, a take-up reel SW2, a drive unit SW3, a DC current generating circuit SW7, a pulse generating circuit SW4, a servo signal write head unit WH and a control circuit SW5. The servo writer SW writes servo signals in the magnetic tape MT by forming servo patterns SP (refer to FIG. 1A) on the servo bands SB (refer to FIG. 1A) of the magnetic tape MT. Such a servo writer SW is also provided with a power source unit, a cleaning unit for cleaning the magnetic tape MT, a verifying unit for verifying servo signals obtained based on the servo patterns SP (refer to FIG. 1A) formed on the magnetic tape MT, etc., all of which are not illustrated.

A magnetic tape MT obtained by cutting a wide web material to a product width before forming servo patterns SP (refer to FIG. 1A) is set in the supply reel SW in the form of a pancake of a large diameter. The supply reel SW1 is designed so as to feed the magnetic tape MT to the servo signal write head unit WH when forming the servo patterns SP. The magnetic tape MT fed from the supply reel SW1 is transferred to the servo signal write head unit WH while being guided by the guide SW6, etc. Moreover, the magnetic tape MT on which servo patterns SP are formed by the servo signal write head unit WH is transferred to the take-up reel SW2 while being guided by the guide SW6, etc. The take-up reel SW2 is driven and rotated by the drive unit SW3 and winds up the magnetic tape MT on which servo patterns SP are formed.

The drive unit SW3 drives and rotates the take-up reel SW2, and is provided with a motor, a motor drive circuit for supplying a current to the motor, a gear for connecting the motor shaft and the take-up reel SW2, all of which are not illustrated. The drive unit SW3 generates a motor current in the motor drive circuit based on a motor current signal from the control unit SW5 and supplies the motor current to the motor. Furthermore, a rotation driving force of the motor is transmitted to the take-up reel SW2 via the gear to drive and rotate the take-up reel SW2.

The DC current generating circuit SW7 is a circuit that supplies a DC current to a coil 11b (refer to FIG. 4), described later, which is provided in the servo signal write head unit WH.

The pulse generating circuit SW4 is a circuit that supplies a recording pulse current to a coil 21b (refer to FIG. 4), described later, which is provided in the servo signal write head unit WH, on the basis of a pulse control signal from the control circuit SW5. In detail, the pulse generating circuit SW4 is designed so as to alternately generate a pulse current, which has a polarity opposite to that of the DC current generated by the DC current generating circuit SW7, and a zero current at predetermined intervals on the basis of the pulse control signal from the control circuit SW5.

(Servo Signal Write Head Unit)

Figure 4:
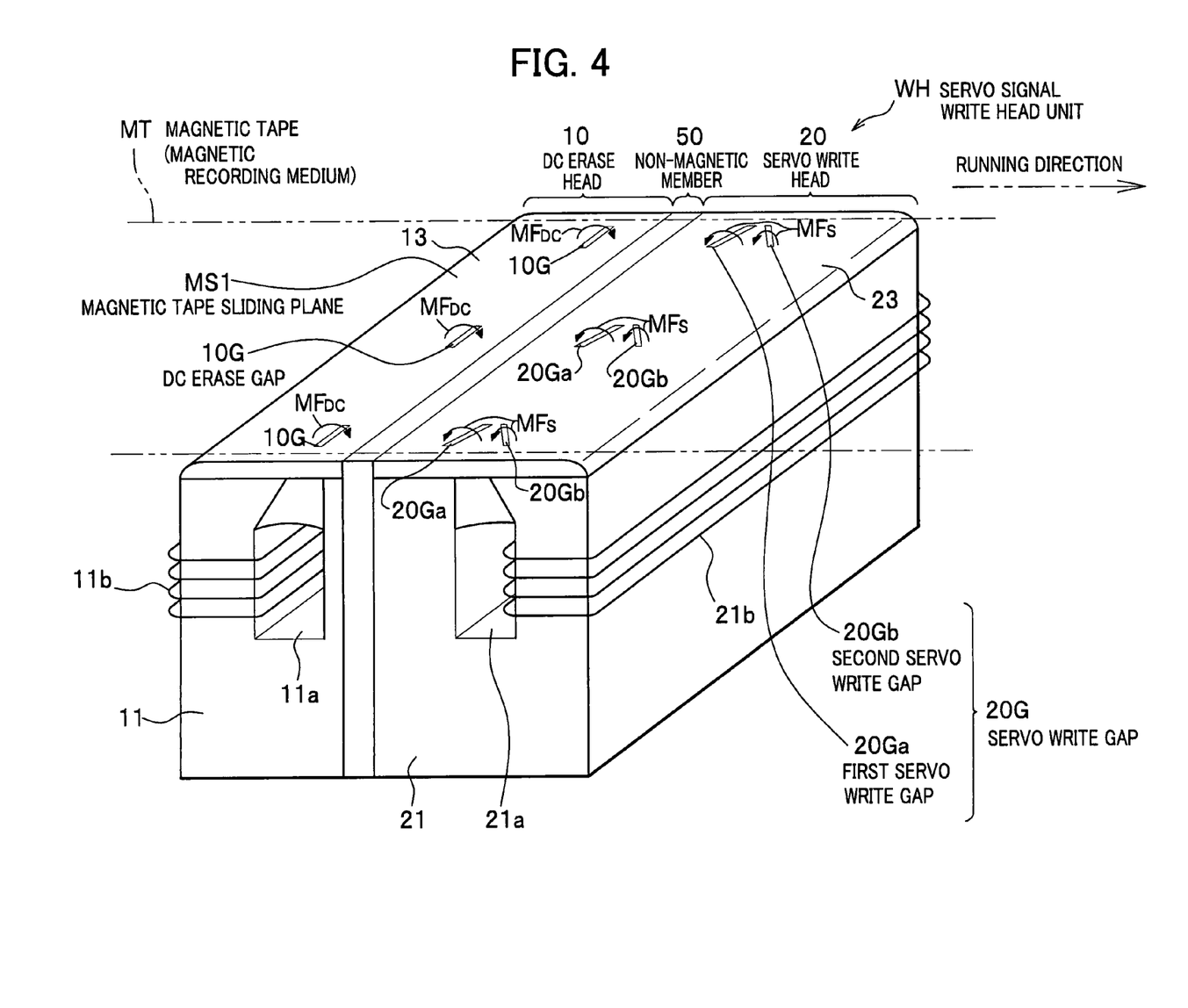
FIG. 4 is a perspective view of a servo signal write head unit.
Figure 5:
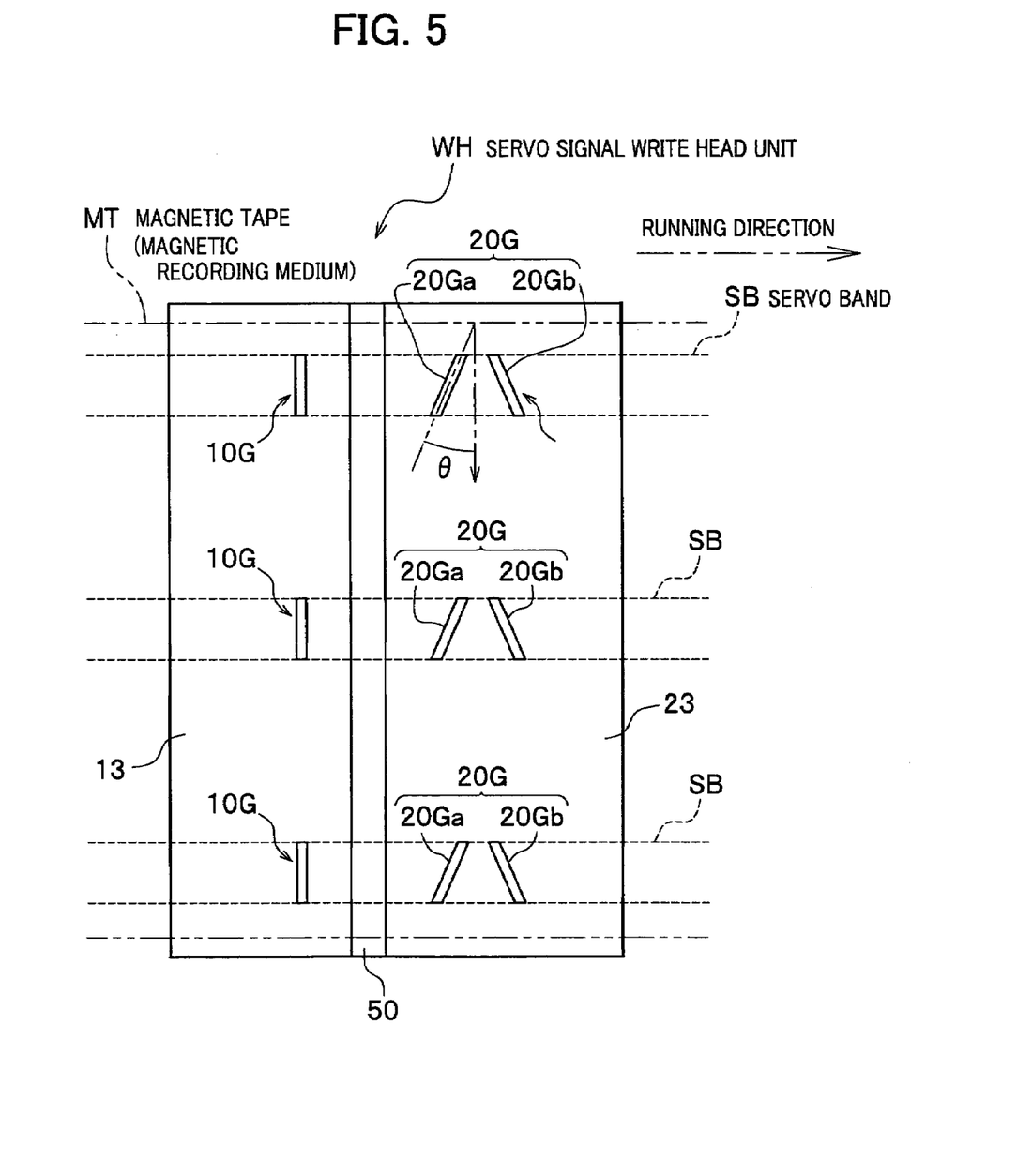
FIG. 5 is a view of the servo signal write head unit of FIG. 4 when observed from the side of a plane where a magnetic tape slides (the magnetic tape sliding plane)

Next, a description is given, of the servo signal write head unit with reference to FIGS. 4 and 5.

As shown in FIG. 4, the servo signal write head unit WH is a composite type magnetic head that is provided with a DC erase head 10 and a servo write head 20. The DC erase head 10 is disposed upstream of a running magnetic tape MT with respect to the servo write head 20, and simultaneously is connected to and integrated with the servo write head 20 with a non-magnetic member 50 intervened therebetween.

(DC Erase Head)

The DC erase head 10 is a head for magnetizing the servo bands SB by means of a DC current so that the portion corresponding to the servo band SB (refer to FIG. 1A) of the magnetic tape MT is oriented in the forward direction as described above. The DC erase head 10 is mainly composed of a magnetic core 11, a surface magnetic film 13 and a coil 11b.

As shown in FIG. 4, the magnetic core 11 is a U-shaped soft magnetic member, and extends in the width direction of the magnetic tape MT. The magnetic core 11 has a coil groove 11a for winding the coil 11b. The coil groove 11a extends in the width direction of the magnetic tape MT.

A surface magnetic film 13 is provided on the upper end surface (the surface opposed to a magnetic tape MT) of the magnetic core 11, and the surface magnetic film 13 and the magnetic core 11 are coupled magnetically to each other. The surface of such a surface magnetic film 13 serves as a magnetic tape sliding plane MS1 on which the magnetic tape MT slides. Note that the surface of the surface magnetic film 13 composes "a surface facing the magnetic recording medium", along with the surface of a surface magnetic film 23 in the servo write head 20 described later. A DC erase gap 10G described later is formed on the portion, where the servo band SB of the magnetic tape MT (refer to FIG. 1A) slides, of the surface magnetic film 13.

The coil 11b is wound on the magnetic core 11, and induces a magnetic flux transmitting to the magnetic core 11 and the surface magnetic film 13 by means of a DC current supplied from the DC current generating circuit SW7 (refer to FIG. 3). Also, the magnetic flux is a leakage flux $MF_{DC}$ by bypassing the DC erase gap 10G on the magnetic tape sliding plane MS1.

(Servo Write Head)

The servo write head 20 is a head that forms servo patterns SP (refer to FIG. 1A) on the servo bands SB by magnetizing the servo bands SB (refer to FIG. 1A) of the magnetic tape MT with the magnetizing direction M1 (refer to FIG. 1A) of the servo bands SB reversed. The servo write head 20 is composed mainly of a magnetic core 21, a surface magnetic film 23, and a coil 21b.

The magnetic core 21 is a roughly U-shaped soft magnetic member, and extends in the width direction of the magnetic tape MT, and is provided with a coil groove 21a for winding the coil 21b. The coil groove 21a extends in the width direction of the magnetic tape MT. The surface magnetic film 23 is provided on the upper end surface (the surface facing a magnetic tape MT) of the magnetic core 21, and the surface magnetic film 23 and the magnetic core 21 are magnetically coupled to each other. The surface of such a surface magnetic film 23 serves as a magnetic tape sliding plane MS1. The surface of the surface magnetic film 23 composes "a surface facing a magnetic recording medium", along with the surface magnetic film 13 of the DC erase head 10 described above. Also, on the surface magnetic film 23, a servo write gap 20G described later is formed at the portion on which the servo bands SB (refer to FIG. 1A) of the magnetic tape MT slides.

The coil 21b is wound on the magnetic core 21, and induces a magnetic flux transmitting through the magnetic core 21 and the surface magnetic film 23 by a recording pulse current supplied from the pulse generating circuit SW4 (refer to FIG. 3). In addition, the magnetic flux is a leakage flux MFs by bypassing the servo write gap 20G on the magnetic tape sliding plane MS1.

(DC Erase Gap and Servo Write Gap)

As shown in FIG. 5, the DC erase gap 10G is slender and rectangular in its plan view and is formed upstream of the servo write gap 20G in the running direction of the magnetic tape MT. The DC erase gap 10G magnetizes the servo bands SB of the running magnetic tape MT in one direction by means of the leakage flux $MF_{DC}$ (refer to FIG. 4).

The servo write gap 20G is composed of a first servo write gap 20Ga and a second servo write gap 20Gb as shown in FIG. 5. The servo write gap 20G forms a trapezoid shape by combining the first servo write gap 20Ga and the second servo write gap 20Gb. The servo write gaps 20G has a shape to form the servo patterns SP shown in FIG. 1A. As shown in FIG. 5, the first servo write gap 20Ga that composes the servo write gap 20G is inclined at the same angle θ as that of the first magnetizing area SP1, that is, from 8 to 20 degrees, (preferably, from 8 to 12 degrees) with respect to the width direction of the servo bands SB of the running magnetic tape MT. The second servo write gap 20Gb that composes the servo write gap 20G is not made parallel to the first servo write gap 20Ga. Further, the angle θ of the second servo write gap 20Gb with respect to the width direction of the servo bands SB is −20 to −8 degrees, preferably −12 to −8 degrees.

Such a servo write gap 20G is disposed downstream of the DC erase gap 10G in the running direction of the magnetic tape MT, and magnetizes the servo bands SB in one direction by means of the leakage flux MFs (refer to FIG. 4) so that the magnetizing direction M1 (refer to FIG. 1A) of the servo bands SB is reversed. Specifically, the servo write gaps 20G form the first magnetizing area SP1 and the second magnetizing area SP2 in the magnetizing direction M2 (refer to FIG. 1A) in the servo bands SB. These DC erase gap 10G and servo write gap 20G are formed on the surface magnetic film 13 and surface magnetic film 23 by means of a known photolithographic method or a similar method.

Next, a description is given, of operations of the servo signal write head unit with reference to the drawings as needed.

Figure 6:
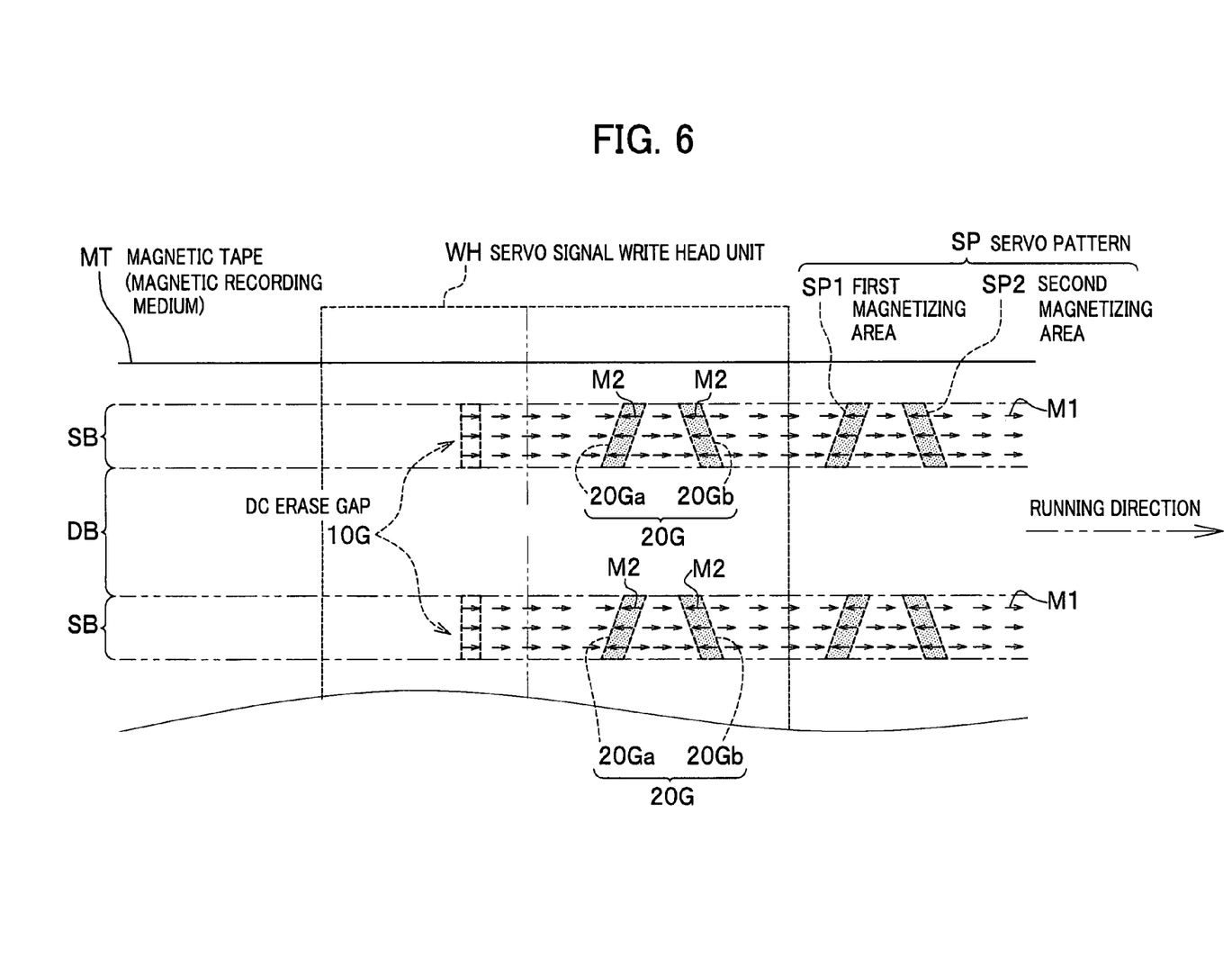
FIG. 6 is a view showing a magnetizing state of a magnetic tape according to the servo signal write head unit.

As shown in FIG. 6, the magnetic tape MT runs on the magnetic tape sliding plane MS1 (refer to FIG. 4) of the servo signal write head unit WH so that the servo write gaps 20G is positioned downstream side of the DC erase gaps 10G.

First, a description is given, of a process by which the DC erase gaps 10G at the upstream side magnetize the servo bands SB in one direction.

When a DC current of, for example, positive polarity is supplied from the DC current generating circuit SW7 (refer to FIG. 3) to the coil 11b (refer to FIG. 4), the coil 11b induces a magnetic flux transmitting through the magnetic core 11 and the surface magnetic film 13 shown in FIG. 4. The magnetic flux bypasses the DC erase gaps 10G (refer to FIG. 4) formed partially on the surface magnetic film 13, and generates a leakage flux $MF_{DC}$ on the magnetic tape sliding plane MS1 (refer to FIG. 4). The orientation of the leakage flux $MF_{DC}$ is made the same as the above-mentioned forward direction by means of a DC current of positive polarity in the embodiment. The servo bands SB are magnetized in one direction by means of the leakage flux $MF_{DC}$, so that it orients in the magnetizing direction M1.

Next, a description is given, of a process by which the servo write head 20 at the downstream side forms servo patterns SP in the servo bands SB.

When a recording pulse current of, for example, negative polarity is supplied from the pulse generating circuit SW4 (refer to FIG. 3) to the coil 21b (refer to FIG. 4), the coil 21b induces a magnetic flux transmitting through the magnetic core 21 and surface magnetic film 23 shown in FIG. 4. The magnetic flux flow bypasses the servo write gap 20G (refer to FIG. 4) formed partially on the surface magnetic film 23, and generates a leakage flux MFs (refer to FIG. 4) on the magnetic tape sliding plane MS1. The orientation of the leakage flux MFs is made reverse of that of the leakage flux $MF_{DS}$ by the recording pulse current of negative polarity in the embodiment. Then, the servo bands SB are magnetized by means of the leakage flux MFs so as to be made reverse of the magnetizing direction M1 of the servo bands SB, wherein servo patterns SP composed of the first magnetizing area SP1 and the second magnetizing area SP2 in the magnetizing direction M2 are formed in the servo bands SB. Since the recording pulse current is supplied to the coil 21b at predetermined intervals, the servo patterns SP are repeatedly formed along the lengthwise direction of a running magnetic tape MT. In this way, the servo patterns SP are repeatedly formed on the magnetized servo bands SB, so that a magnetic tape MT according to the embodiment can be obtained.

With this magnetic tape MT, it is possible to enhance the resolution of servo signals in the width direction of the servo bands SB by increasing the angle θ of the first magnetizing area SP1. Specifically, the magnetic tape MT which has the first magnetizing areas with an angle θ of 8 degrees exhibits about 1.5 times greater resolution than that of the magnetic tape MT which has the first magnetizing areas with an angle θ of 6 degrees. Furthermore, the magnetic tape MT having the first magnetizing areas of 12 degrees exhibits about 2 times greater resolution.

In addition, with the magnetic tape MT, it is possible to increase the output and SN ratio of the servo signals by allowing the magnetizing direction M1 of the servo bands SB to be opposite to the magnetizing direction M2 of the areas SP1 and SP2. As a result, the output and SN ratio of the servo signals in the magnetic tape MT is increased. Therefore, even if any azimuth loss is produced in the output and SN ratio of the servo signals due to the large angle θ, this azimuth loss is compensated. Consequently, with the magnetic tape MT, the magnetic head H (refer to FIG. 2) can be accurately positioned with respect to the magnetic tape MT even if higher-density recording is attempted and the width between the servo bands SB is narrowed.

Up to this point, the embodiment of the present invention has been described. However, the present invention is not limited to this embodiment. For example, in the embodiment, a magnetic tape is taken as an example of a magnetic recording medium. Alternatively, the magnetic recording medium may be a magnetic disk (HD), a flexible disk, etc.

Also, in the embodiment, servo patterns SP are formed in the magnetic tape MT (magnetic recording medium) in which only the servo bands SB are magnetized. However, the present invention may be applicable to such a type that servo patterns SP are formed in the servo bands SB of a magnetic tape MT which is magnetized in the entire width (the entirety of the magnetic recording medium) of the magnetic tape MT.

Figure 7A:
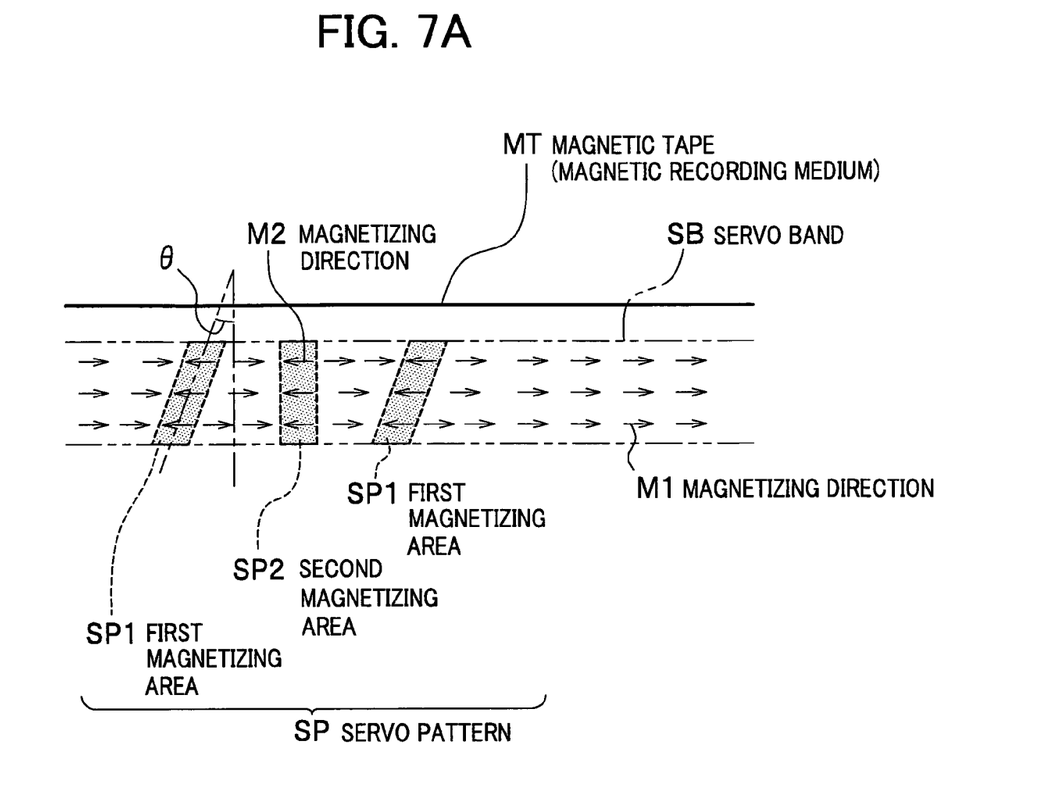
FIG. 7A is a view showing servo patterns of a magnetic tape according to another embodiment.

Further, although in the magnetic tape MT (magnetic recording medium) according to the embodiment, the servo patterns SP are formed so as to be widened toward one end by the first magnetizing area SP1 and the second magnetizing area SP2, a magnetic recording medium according to the present invention is not limited thereto. For example, as shown in FIG. 7A, the servo pattern SP may be a servo pattern SP composed of a combination of the first magnetizing areas SP1 inclined at angle θ (θ: from 8 to 20 degrees) and the second magnetizing area SP2 which is sandwiched between the adjacent first magnetizing areas SP1 and which extends in parallel with the width direction of the servo band SB.

Figure 7B:
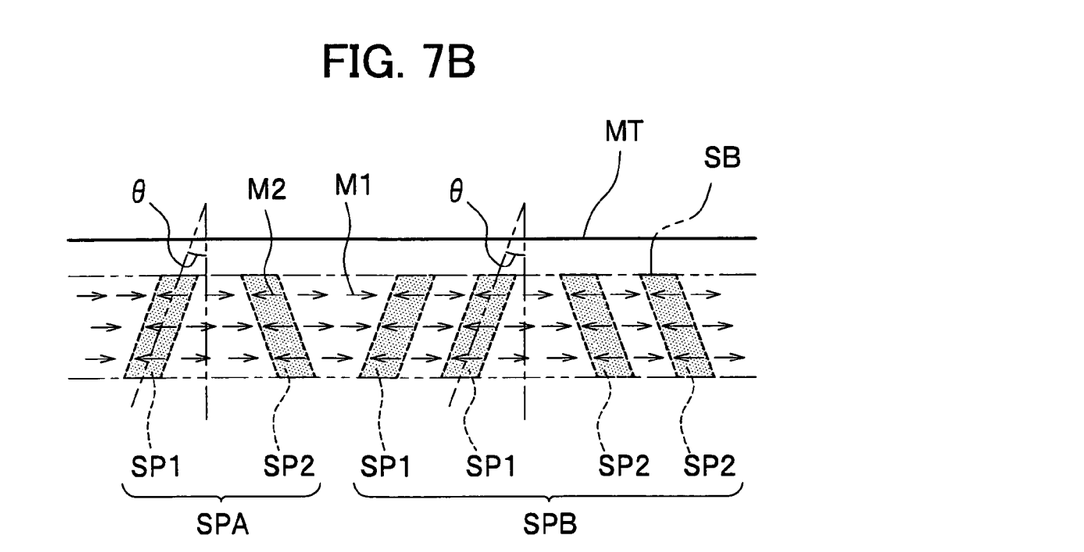
FIG. 7B is a view showing servo patterns of a magnetic tape according to another embodiment.

In addition, although the magnetic tape MT (magnetic recording medium) according to the embodiment has a single type of servo patterns SP, the present invention is not limited thereto. Alternatively, the servo patters SP have different types. As such servo patterns SP, for example, as shown in FIG. 7B, such a type may be possible, which has a servo pattern SPB composed of a combination of the first magnetizing area SP1 disposed at an angle θ (from 8 to 20 degrees) and a pair of the second magnetizing areas SP2 being not parallel to these first magnetizing areas SP1 in addition to a servo pattern SPA similar to the servo pattern SP forming a trapezoid shape in the embodiment. Also, a magnetic recording medium having two or more types of servo patterns SP may be applicable using two or more servo patterns SP as a combination, and this combination is repeated in the direction (the lengthwise direction of the servo bands SB) along which the servo bands SB extend.

Figure 8:
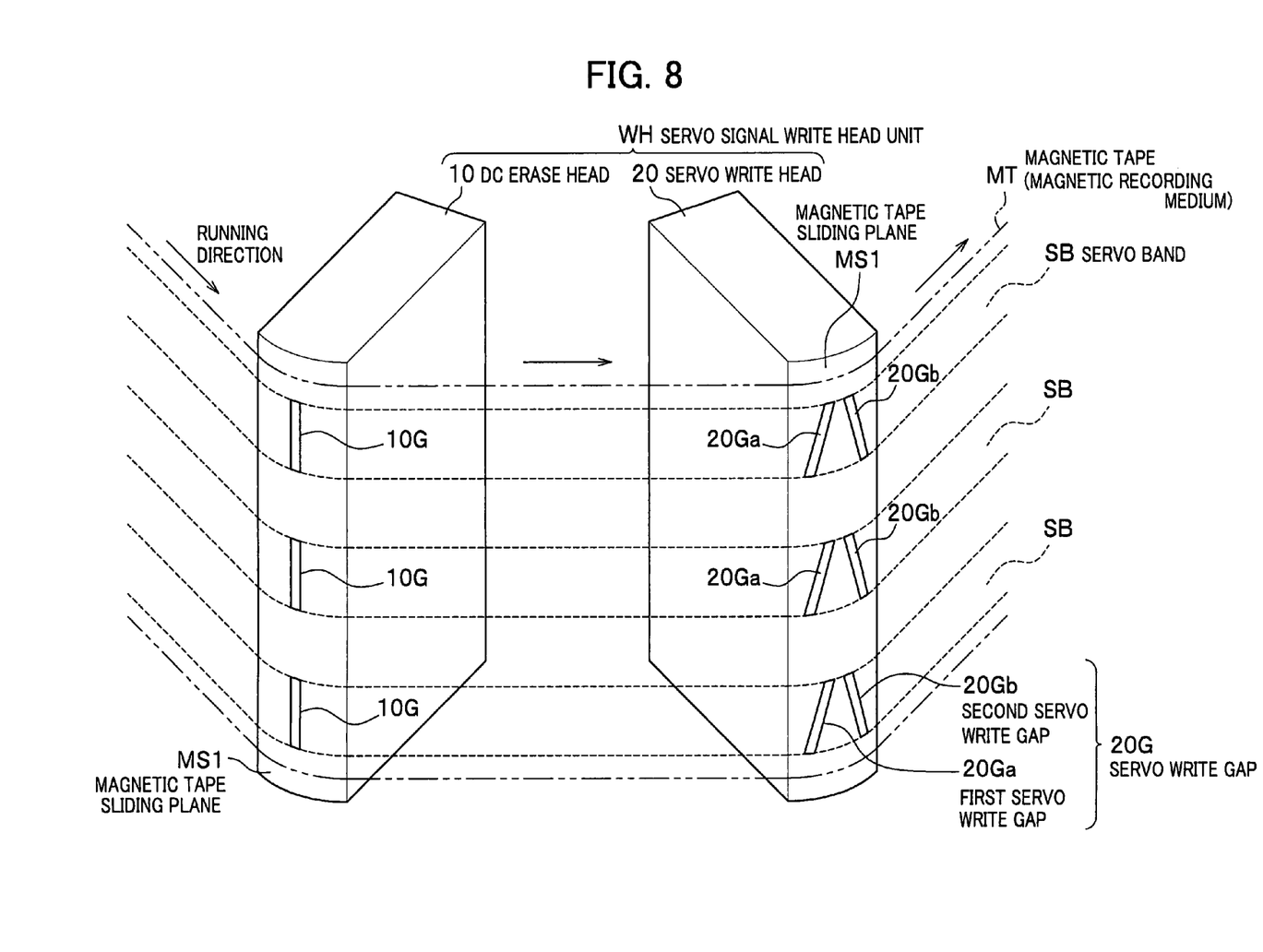
FIG. 8 is a perspective view showing a servo signal write head unit according to another embodiment.

Also, in the embodiment, a composite type magnetic head is used as the servo signal write head unit WH, in which the DC erase head 10 and the servo write head 20 are connected to each other via a non-magnetic member 50, and are therefore integrated. However, the servo signal write head unit according to the present invention may be such a type in which the DC erase head 10 and the servo write head 20 are independent from each other. Specifically, as shown in FIG. 8, in the servo signal write head unit WH, a DC erase head 10 in which DC erase gaps 10G are formed on the magnetic tape sliding plane MS1 (the surface facing a magnetic recording medium) and a servo write head 20 on which servo write gaps 20G composed of the first servo write gaps 20Ga and the second servo write gaps 20Gb are formed on the magnetic tape sliding plane MS1 (the surface facing a magnetic recording medium) are independent from each other. Moreover, in the servo signal write head unit WH, the DC erase head 10 is disposed upstream of the servo write head 20.

Similar to the servo signal write head unit WH according to the embodiment, the servo write gap 20G is composed of a combination of the first servo write gap 20Ga and the second servo write gap 20Gb in this servo signal write head unit WH, and this combination forms a trapezoid shape. Furthermore, the first servo write gap 20Ga is inclined at the same angle θ as the angle θ (refer to FIG. 1B) of the first magnetizing area SP1 with respect to the width direction of the servo bands SB of the magnetic tape MT (Magnetic recording medium), that is, at an angle from 8 to 20 degrees (preferably, from 8 to 12 degrees). Also, the second servo write gaps 20Gb that compose the servo write gaps 20G are not made parallel to the first servo write gaps 20Ga.

In a servo signal write head unit WH of this type, the DC erase gap 10G magnetizes the servo bands SB as with the servo signal write head unit WH according to the embodiment, and at the same time, servo patterns SP (refer to FIG. 6) are formed on the servo bands SB by the servo write gap 20G magnetizing the servo bands SB so that the servo bands SB are magnetized reversely of the magnetizing direction of the servo bands SB. Specifically, with the servo signal write head unit WH, it is possible to provide a magnetic tape MT (magnetic recording medium) in which servo patterns SP (refer to FIG. 1A) including the first magnetizing area SP1 and the second magnetizing area SP2 in the embodiment are formed.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A magnetic recording medium comprising:
   at least one servo band being magnetized in one direction and including a plurality of servo patterns being formed repeatedly along a long side of the servo band,
   each of the servo patterns comprising:
      a first magnetizing area being formed across a width of the servo band at an angle from 8 to 20 degrees with respect to the width; and
      a second magnetizing area being formed across the width of the servo band in non-parallel with the first magnetizing area,
   wherein the first and second magnetizing areas are magnetized in a direction opposite to that of the servo band; and
   wherein the first and second magnetizing areas are formed in a straight line, and are symmetrical with each other around a line extending in a width direction of the servo band; and
   the first and second magnetizing areas form a pattern which provides tracking control in a traverse direction of the magnetic recording medium for a servo read head.

2. The magnetic recording medium according to claim 1, wherein a whole width of the magnetic recording medium is magnetized in the one direction, when the servo band is magnetized in the one direction.

3. The magnetic recording medium according to claim 1, wherein the angle of the first magnetizing area ranges from 8 to 12 degrees.

4. The magnetic recording medium according to claim 3, wherein the second magnetizing area forms a trapezoid shape with the first magnetizing area.

5. The magnetic recording medium according to claim 4, wherein an angle of the second magnetizing area ranges from −12 to −8 degrees with respect to the width of the servo band.

6. The magnetic recording medium according to claim 1, wherein the second magnetizing area forms a trapezoid shape with the first magnetizing area.

7. The magnetic recording medium according to claim 6, wherein an angle of the second magnetizing area ranges from −20 to −8 degrees with respect to the width of the servo band.

8. The magnetic recording medium of claim 1, wherein an edge of the first magnetizing area coincides with an edge of the servo band.

9. The magnetic recording medium of claim 8, wherein an edge of the second magnetizing area coincides with an edge of the servo band.

10. A servo signal write head unit comprising:

a DC erase head having DC erase gaps for magnetizing servo bands on a magnetic recording medium, so that a magnetizing direction of the servo bands is oriented in one direction, the DC erase head facing a surface of the magnetic recording medium; and a servo write head having servo write gaps for forming servo patterns on the servo bands by magnetizing the servo bands in a direction opposite to that of the servo bands, the servo write head facing the surface of the magnetic recording medium;

each of the servo write gaps comprising a first servo write gap inclined at an angle from 8 to 20 degrees with respect to a width of the servo bands, and a second servo write gap non-parallel to the first servo write gap;

wherein the first and second servo write gaps are formed in a straight line, and are symmetrical with each other around a line extending in a width direction of the servo band; and the first and second servo write gaps record a pattern which provides tracking control in a traverse direction of the magnetic recording medium for a servo read head.

11. The servo signal write head unit according to claim 10, wherein the angle of the first servo write gap ranges from 8 to 12 degrees.

12. The servo signal write head unit according to claim 11, wherein the second servo write gap forms a trapezoid shape with the first servo write gap.

13. The servo signal write head unit according to claim 12, wherein an angle of the second servo write gap ranges from −12 to −8 degrees with respect to the width of the servo bands.

14. The servo signal write head unit according to claim 11, wherein the DC erase head is positioned upstream of the servo write head in a running direction of the magnetic recording medium.

15. The servo signal write head unit according to claim 11, wherein the DC erase head and the servo write head are integrated.

16. The servo signal write head unit according to claim 10, wherein the second servo write gap forms a trapezoid shape with the first servo write gap.

17. The servo signal write head unit according to claim 16, wherein an angle of the second servo write gap ranges from −20 to −8 degrees with respect to the width of the servo bands.

18. The servo signal write head unit according to claim 10, wherein the DC erase head is positioned upstream of the servo write head in a running direction of the magnetic recording medium.

19. The servo signal write head unit according to claim 10, wherein the DC erase head and the servo write head are integrated.

20. A servo writer comprising the servo signal write head unit according to claim 10.

21. The write head of claim 10, wherein said DC head erase head is operable to apply the magnetizing direction in one direction across a width of a recording medium in a single pass of the DC erase head.

22. The write head of claim 21, wherein the servo write head forms servo patterns in the opposite magnetization direction to the first direction.

* * * * *